United States Patent
Cambruzzi et al.

(10) Patent No.: US 11,235,954 B2
(45) Date of Patent: Feb. 1, 2022

(54) ALIGNMENT DEVICE AND METHOD FOR MOUNTING A GUIDE RAIL IN AN ELEVATOR SHAFT OF AN ELEVATOR SYSTEM

(71) Applicant: Inventio AG, Hergiswil (CH)

(72) Inventors: Andrea Cambruzzi, Zurich (CH); Erich Bütler, Ebikon (CH); Philipp Zimmerli, Härkingen (CH); Raphael Bitzi, Ebikon (CH)

(73) Assignee: INVENTIO AG, Hergiswil NW (CH)

( * ) Notice: Subject to any disclaimer, the term of this patent is extended or adjusted under 35 U.S.C. 154(b) by 97 days.

(21) Appl. No.: 16/641,288

(22) PCT Filed: Sep. 18, 2018

(86) PCT No.: PCT/EP2018/075161
§ 371 (c)(1),
(2) Date: Feb. 24, 2020

(87) PCT Pub. No.: WO2019/063356
PCT Pub. Date: Apr. 4, 2019

(65) Prior Publication Data
US 2020/0377339 A1 Dec. 3, 2020

(30) Foreign Application Priority Data
Sep. 27, 2017 (EP) .................................... 17193506

(51) Int. Cl.
*B66B 19/00* (2006.01)
*G01C 15/00* (2006.01)

(52) U.S. Cl.
CPC .......... *B66B 19/002* (2013.01); *G01C 15/004* (2013.01)

(58) Field of Classification Search
None
See application file for complete search history.

(56) References Cited

U.S. PATENT DOCUMENTS 2,402,888 A * 6/1946 Hall ...................... B66B 5/0087
33/645
3,161,964 A * 12/1964 Myles ................... B66B 19/002
33/353

(Continued)

FOREIGN PATENT DOCUMENTS

CN 105829234 A 8/2016
CN 106064774 A 11/2016
(Continued)

OTHER PUBLICATIONS

Feng Hua-Ming, "The Auto Rise Installation of Driving Elevator", Urban Research Journal, Dec. 30, 2003, pp. 53-60, China.

Primary Examiner — Christopher W Fulton
(74) Attorney, Agent, or Firm — William J. Clemens; Shumaker, Loop & Kendrick, LLP (57) ABSTRACT

A method for mounting a guide rail in an elevator system elevator shaft first carries out mounting steps by a mounting device having a carrier component, an installation component and a control apparatus controlling the installation component. The control apparatus determines, on the basis of an actual position of the mounting device and a desired position of a guide rail to be installed, a position of a marking on a shaft wall of the elevator shaft relative to the actual position of the mounting device. Based on the marking, an installation step determines the desired position of the guide rail. The marking is applied to the shaft wall by the installation component. The previous steps are followed by the steps of alignment the guide rail in relation to the marking and fastening the guide rail to the shaft wall, which steps can be performed manually by an installer.

11 Claims, 4 Drawing Sheets

(56) References Cited

U.S. PATENT DOCUMENTS

| | | | | |
|---|---|---|---|---|
| 3,851,736 | A * | 12/1974 | Westlake | B66B 19/002 52/745.2 |
| 4,593,794 | A * | 6/1986 | Russeau | B66B 19/002 33/404 |
| 5,119,908 | A * | 6/1992 | Korhonen | B66B 7/027 187/408 |
| 6,196,356 | B1 * | 3/2001 | Sneed | B66B 7/024 187/408 |
| 7,654,006 | B1 * | 2/2010 | Mooney | G01B 11/272 33/286 |
| 8,302,319 | B1 * | 11/2012 | Chen | G01C 15/004 33/286 |
| 10,853,902 | B2 * | 12/2020 | Atkinson | G08B 21/18 |
| 11,111,109 | B2 * | 9/2021 | Cambruzzi | B66B 19/00 |
| 2005/0174582 | A1 * | 8/2005 | Carr | G01B 11/14 356/614 |
| 2009/0120734 | A1 * | 5/2009 | Barneman | B66B 19/002 187/408 |
| 2013/0025236 | A1 * | 1/2013 | Erny | B66B 19/00 52/745.15 |
| 2015/0128403 | A1 * | 5/2015 | Valkama | B66B 19/002 29/464 |
| 2015/0217972 | A1 * | 8/2015 | Hawkins | B66B 19/002 187/391 |
| 2015/0360913 | A1 * | 12/2015 | Fernandez | B66B 7/1246 187/408 |
| 2016/0311657 | A1 | 10/2016 | Kilpeläinen | |
| 2017/0001842 | A1 * | 1/2017 | Puntener | B66B 19/002 |
| 2017/0015523 | A1 * | 1/2017 | Baker | F16M 13/02 |
| 2019/0367328 | A1 * | 12/2019 | Cambruzzi | B32B 37/00 |
| 2020/0055709 | A1 * | 2/2020 | Cambruzzi | G01B 5/25 |
| 2020/0299105 | A1 * | 9/2020 | Cambruzzi | B66B 19/002 |
| 2021/0156666 | A1 * | 5/2021 | Cambruzzi | G01B 11/002 |
| 2021/0238011 | A1 * | 8/2021 | Haag | B66B 7/024 |

FOREIGN PATENT DOCUMENTS

| | | | |
|---|---|---|---|
| CN | 107074491 A | 8/2017 | |
| EP | 2873640 A1 | 5/2015 | |
| EP | 3085660 A1 | 10/2016 | |
| JP | S58197176 A | 11/1983 | |
| JP | H04223988 A | 8/1992 | |
| JP | H05105362 A | 4/1993 | |
| JP | 05193865 A * | 8/1993 | B66B 19/002 |
| JP | 2003104653 A | 4/2003 | |
| JP | 2010036997 A | 2/2010 | |
| WO | 2007135228 A1 | 11/2007 | |
| WO | 2015091419 A1 | 6/2015 | |
| WO | 2017016780 A1 | 2/2017 | |
| WO | 2017016781 A1 | 2/2017 | |
| WO | 2017016783 A1 | 2/2017 | |
| WO | 2017167719 A1 | 10/2017 | |

* cited by examiner

ALIGNMENT DEVICE AND METHOD FOR MOUNTING A GUIDE RAIL IN AN ELEVATOR SHAFT OF AN ELEVATOR SYSTEM

FIELD

The invention relates to an alignment device for aligning a guide rail in an elevator shaft of an elevator system and to a method for mounting a guide rail in an elevator shaft of an elevator system.

BACKGROUND

When an elevator system is installed in an elevator shaft, various mounting steps are carried out; for example, different shaft materials, for example in the form of rail brackets or guide rails, must be mounted at respective desired positions in the elevator shaft. During operation of the elevator system, the guide rails are used to guide the elevator cars and optionally associated counterweights. The guide rails are conventionally secured to a shaft wall of the elevator shaft by means of a rail bracket, which comprises a rail bracket lower part and a rail bracket upper part, and so-called rail clips. For this purpose, the rail bracket lower part is conventionally first secured to the shaft wall by means of screws or tie bolts, for example, and the guide rail is fastened to the rail bracket upper part by means of the rail clips. The guide rail is then aligned and the rail bracket lower part is firmly screwed to the rail bracket upper part in the position resulting from alignment. Rail brackets are also referred to as bracket elements.

The rail bracket can also be designed as an "omega bracket". An omega bracket has two rail bracket lower parts which are secured so as to rest against a shaft wall and are connected by a rail bracket upper part. An omega bracket is designed and mounted on a shaft wall such that a gap is produced between the rail bracket upper part and the shaft wall, through which gap a counterweight of an elevator car can be guided. Rail clips are also arranged on the rail bracket upper part, by means of which clips a guide rail can be fixed to the rail bracket upper part and therefore to the shaft wall.

Correct mounting and in particular precise alignment of the guide rails is very important for the travel comfort of the elevator cars. In this connection, aligning a guide rail is intended to be understood to mean both the correct position in the elevator shaft and the position in relation to possibly adjacent guide rails. The exact alignment of guide rails is also important in particular because it can only be corrected with a high degree of effort, if at all, after all the necessary guide rails of an elevator system have been secured.

When the guide rails are mounted, usually one guide rail is first fully mounted, including alignment, and mounting of the following guide rail is then initiated. In order to be able to align the guide rails, reference elements, for example in the form of guide lines, are usually tensioned in the elevator shaft, in relation to which elements the guide rails must be aligned. A method of this kind is described in WO 2015/091419 A1, for example. The guide rails can therefore be aligned precisely. However, mounting and aligning is fairly time-consuming, as various working steps often have to be carried out using different tools. In addition, the reference elements may be at a considerable spacing from the guide rail, which spacing has to be bridged in a complex manner in order to orient the guide rails.

For efficient mounting of guide rails, it may be advantageous if the guide rails are not fully mounted one after the other, but, for example, only all the necessary rail bracket bases are first secured to the shaft walls and then the guide rails are aligned and mounted one after the other. This is in particular the case if the securing of the rail bracket lower parts or at least the drilling of holes that are necessary therefor in the shaft wall and the introduction of the fastening elements in the form of screws or tie bolts is carried out in a partially automated manner, for example using a mounting device according to WO 2017/016783 A1 from the applicant.

The reference elements tensioned in the elevator shaft can interfere with the mounting of the guide rails. In addition, there is the risk that the position of the reference elements is changed while the guide rails are being mounted, thus leading to incorrect alignment of the guide rails and therefore ultimately to poor travel comfort and greater wear to the elevator car.

JPH 05105362 A and EP 3085660 A1 describe an automated mounting device for carrying out installations in an elevator shaft of an elevator system. These mounting devices can align guide rails and secure them to a shaft wall. In this case, alignment is carried out relative to reference elements arranged in the elevator shaft in the form of reference lines.

SUMMARY

Against this background, an object of the invention is in particular to propose an alignment device for aligning a guide rail in an elevator shaft of an elevator system and a method for mounting a guide rail in an elevator shaft of an elevator system, which allow efficient and yet precise mounting and aligning of guide rails in an elevator shaft.

The object is solved by an alignment device for aligning a guide rail in an elevator shaft of an elevator system, which device is designed to align the guide rail relative to a marking on a shaft wall of the elevator shaft, which marking comprises at least three mutually spaced dots. The alignment device has an abutment part with a recess which has a complementary shape to a running surface of the guide rail and a targeting device which is designed and arranged such that the abutment part can be brought into a defined position relative to the marking on the shaft wall. The targeting device comprises a laser means which can project at least three mutually spaced dots onto the shaft wall of the elevator shaft. The abutment part and the targeting device can together form a component.

The alignment device is therefore designed to align a guide rail with respect to markings on the shaft wall which have been applied in an automated manner in particular by a mounting device. The markings applied to the shaft wall must be adapted to the alignment device used for aligning the guide rail.

A guide rail comprises in particular a bottom and a connecting portion, which are arranged in a T-shape with respect to one another. The guide rail is arranged in the elevator shaft such that the bottom of the guide rail abuts the rail bracket upper part at least directly, i.e. is oriented in the direction of the shaft wall. The connecting portion is therefore oriented in the direction of the elevator shaft. Said connecting portion has a machined running surface of the guide rail, which surface consists of three partial running surfaces in total. Said surface consists of a front partial running surface, which primarily extends in parallel with the shaft wall, and two lateral partial running surfaces connected to the front partial running surface. The complementary shape of the recess of the abutment part of the alignment device corresponds to a plane that is transverse to the main extension direction of the elevator shaft. In this case, the recess does not need to be designed such that it can completely accommodate all three partial running surfaces. It is particularly important that the recess is designed such that the abutment part can be arranged in relation to the guide rail such that the guide rail extends through the recess and the abutment part abuts the complete front partial running surface and at least parts of the lateral partial running surface, and therefore a defined position of the abutment part and therefore of the alignment device in relation to the running surface of the guide rail and therefore in relation to the entire guide rail is specified.

The laser means has in particular three lasers which can each emit a laser beam. The laser means is arranged on the targeting device such that the guide rail is correctly aligned when the three laser beams are oriented in relation to the marking on the shaft wall in a predetermined manner. The lasers are in particular arranged such that they project the dots mentioned onto the shaft wall to which the guide rail is fastened. The orientation is correct in particular when the laser beams of the three lasers are exactly aligned with three mutually spaced dots of the marking on the shaft wall. This can be controlled particularly easily, thus allowing particularly easy and simultaneously precise alignment of the guide rails. It is also possible for the laser means to have only one laser which can be brought into three different defined positions.

It is also possible for the laser means to be designed such that it projects a triangle onto the shaft wall. In this case, each corner of the triangle corresponds to one of the mentioned dots which are projected onto the shaft wall.

During an alignment process, the alignment device can be fastened to the guide rail by means of a clamping device or a magnet, for example.

In an embodiment of the invention, the alignment device has an elongate verification marking. The verification marking is designed such that a correct course of a cord fastened to the alignment device can be checked. When the alignment device in the elevator shaft rests correctly on the guide rail, the verification marking extends in particular primarily perpendicularly to the shaft wall. The cord connects in particular two alignment devices whilst simultaneously alignment two opposing guide rails. The alignment of two opposing guide rails can therefore be checked in a simple and effective manner.

The above-mentioned object is also achieved by a method for mounting a guide rail in an elevator shaft of an elevator system, in which method first some mounting steps are carried out by means of a mounting device, which has a carrier component, an installation component and a control apparatus for controlling the installation component. The carrier component is designed to be displaced relative to the elevator shaft and to be positioned at different heights within the elevator shaft. The installation component is held on the carrier component and is designed to carry out a mounting step as part of the installation process in an at least partially automated manner. According to the invention, the control apparatus determines, on the basis of an actual position of the mounting device and a desired position of a guide rail to be installed in the elevator shaft, a position of a marking on a shaft wall of the elevator shaft relative to the actual position of the mounting device. On the basis of said marking, the desired position of the guide rail can be determined in a following installation step. This marking is applied to the shaft wall by means of the installation component.

The mentioned steps are followed by the steps of aligning the guide rail relative to said marking and fastening the guide rail to the shaft wall. In particular, these two steps are performed manually by an installer.

The elevator shaft extends in particular primarily in a main direction of extension. In this case, the main extension direction of the elevator shaft should be understood to mean the direction in which an elevator car of the fully mounted elevator system is moved. The main extension direction therefore extends in particular vertically, but can also extend so as to be inclined with respect to the vertical, or can extend horizontally. In this case, the main extension direction does not necessarily need to extend along a single straight line over the entire length of the elevator shaft. It is also possible, for example, for the course of the main extension direction to be composed of straight portions, the transition regions of which may also be rounded.

The marking on the shaft wall can be applied, for example, using a pen, a stamp, a scriber, a drill, a milling tool or a powerful laser. The necessary tool for this is in particular arranged on the installation component and is therefore part of the installation component.

In an embodiment of the invention, an above-described alignment device is arranged on the guide rail for aligning the guide rail relative to the mentioned marking and the three dots projected onto the shaft wall by the laser means of the targeting device are brought into alignment with a marking on the shaft wall. The guide rail can therefore be aligned particularly easily and precisely.

In an embodiment of the invention, at least three mutually spaced dots are marked on the shaft wall by means of the mentioned marking, the dots in particular not being on a common straight line. The position of the guide rail is clearly identified by the marking of three mutually spaced dots. The marking may consist of three separate dots or crosses, for example. It is also possible for the marking to be designed as a triangle, the corners of which indicate said three dots. In this case, it is also possible that additional marking elements, such as additional lines, are also arranged at said ends. For example, it is conceivable that an entire triangle is not applied to the shaft wall, but instead only the corners and in each case a short part of the sides of the triangle are applied. In addition, it is possible for the marking to consist of a combination of a dot and a line, the ends of which indicate the two further dots. Moreover, hybrid forms of said embodiments and other markings which are considered to be expedient by a person skilled in the art are also conceivable.

In an embodiment of the invention, the actual position of the mounting device and the desired position of the guide rail to be installed is determined on the basis of at least one, in particular two, reference elements arranged in the elevator shaft, which element extends in particular in the main extension direction of the elevator shaft. The reference elements are in particular designed as cords which are tensioned in the elevator shaft primarily in the main extension direction. By applying the markings on the shaft wall of the elevator shaft on the basis of the reference elements, the position of the reference elements in the elevator shaft is more or less transferred to the shaft wall.

In an embodiment of the invention, two opposing guide rails are aligned simultaneously. Simultaneous alignment is also understood to mean that first a guide rail is aligned and then the second guide rail is also aligned relative to the first guide rail. With the alignment of the second guide rail, in particular the alignment of the first guide rail can be checked and corrected if necessary. However, the second, opposing guide rail is always aligned before a further guide rail which is connected to the first guide rail. An elevator car is typically guided on two opposing guide rails during operation. The travel comfort therefore depends on the alignment of the two guide rails and in particular on the alignment of the guide rails with respect to one another. The described alignment of two opposing guide rails can also allow precise alignment of the guide rails with respect to one another.

The two opposing guide rails are aligned in relation to the marking on the relevant shaft wall in particular by means of an alignment device in each case, which devices are connected by means of a cord. In order to ensure the correct alignment of the two guide rails with respect to one another, a correct course of said cord is checked. In addition, one or both alignment devices may comprise an elongate verification mark, for example in the form of a groove or a slot, over which the cord must extend when the two guide rails are correctly aligned with respect to one another. It is therefore possible to check the correct alignment of the two guide rails with respect to one another in a particularly simple and reliable manner.

In an embodiment of the invention, the spacing between the two opposing guide rails in particular transversely to the main extension direction of the elevator shaft is checked. In order to be able to guide the elevator car correctly, the guide rails must be at a predetermined spacing. Checking this spacing allows a high level of travel comfort of the elevator car.

The spacing mentioned can be checked by means of a so-called track gauge, for example. The track gauge is a rod having a defined length which corresponds to the desired spacing of the guide rails.

The mounting device by means of which markings can be applied to the shaft wall comprises a carrier component, an installation component, and at least one control apparatus at least for controlling the installation component. The carrier component is designed to be displaced relative to the elevator shaft and to be positioned at different heights within the elevator shaft. The installation component is held on the carrier component and is designed to carry out a mounting step as part of the installation process in an at least partially automated manner. The control apparatus is provided to determine, on the basis of an actual position of the mounting device and a desired position of a guide rail to be installed in the elevator shaft, a position of a marking on a shaft wall of the elevator shaft relative to the actual position of the mounting device, on the basis of which position the desired position of the guide rail can be determined in a following installation step. The installation component is designed to apply the marking mentioned to the shaft wall. Applying said marking is therefore also a mounting step in the context of an installation process in an elevator shaft of an elevator system. The marking is applied in particular to the shaft wall on which the guide rail is secured. However, it is also conceivable to apply the marking to another shaft wall.

The carrier component can be configured in various ways. For example, the carrier component may be designed as a simple platform, framework, scaffold, cab, or the like. The carrier component is displaced in particular by means of a displacement component, for example a winch, which can be arranged in a shaft head of the elevator shaft. The support component may furthermore have a securing component that is designed to secure the carrier component in the elevator shaft in a direction transverse to the vertical, i.e. for example in a horizontal or lateral alignment. This securing can also be referred to as positioning. The carrier component is for example designed as a carrier component of the mounting device described in WO 2017/016783 A1.

The installation component can in particular be mechatronic, i.e. it can have interacting mechanical, electronic and information-technology elements or modules. For example, the installation component may comprise a suitable mechanism in order to handle tools within a mounting step for example. In this case, the tools can be appropriately moved into a mounting position by the mechanism and/or appropriately guided during a mounting step. Alternatively, the installation component may also itself comprise a suitable mechanism that forms a tool.

The mechatronic installation component comprises in particular an industrial robot. An industrial robot may be understood to mean a universal, usually programmable machine for handling, mounting and/or processing workpieces and components. Such robots are designed for use in an industrial environment and have been used, for example, in the industrial production of complex goods in large quantities, for example in automotive manufacturing. The industrial robot is in particular designed to be coupled at its unsupported end to various mounting tools.

The installation component is for example designed as an installation component of the mounting device described in WO 2017/016783 A1.

It is also possible for the installation component to be provided mainly or exclusively for applying said markings to the shaft wall. In this case, a mechanical component is not necessary. For example, it would be conceivable for the markings to be provided using a high-energy laser beam. In this case, no securing device or only a very simple securing device is required for positioning the mounting device in the elevator shaft.

The control apparatus mentioned controls at least the installation component. The control apparatus is programmed during preparation of the installation process such that, as part of the installation process, at least one mounting step can be carried out partially automatically or fully automatically by the mounting device. The mounting device can have more than one control apparatus, which apparatuses are interconnected by signals.

In order that the control apparatus can determine the actual position of the mounting device, the mounting device comprises in particular a positioning component. The control apparatus can determine the position of the mounting device in different ways using the positioning component. For instance, it is conceivable to determine the position using optical measurement principles. For example, laser distance measuring devices can measure distances between the positioning component and walls of the elevator shaft or between the positioning component and reference elements arranged in the elevator shaft. Other optical measurement methods such as stereoscopic measurement methods or measurement methods based on triangulation are also conceivable. In addition to optical measurement methods, various other position-determining methods are also conceivable, for example based on radar reflections or the like. A measuring system is also used which evaluates height information on a magnetic strip arranged in the elevator shaft and extending in the main extension direction or a strip having optically evaluable information. The positioning component can be designed, for example, as the positioning component in the international application from the applicant having the number WO 2017/167719 A1.

The desired position of the guide rail to be installed in the elevator shaft is established in particular when the control apparatus is programmed. The desired position is determined in particular with regard to a reference element in the elevator shaft. However, it is also possible for a digital model of the elevator shaft to be used to establish the desired position. On the basis of this desired position and the actual position of the mounting device, the control apparatus determines the position of markings which are applied to the shaft wall and, in a following installation step, allow the desired position of the guide rail to be determined. The desired position of the guide rail is determined relative to the actual position of the mounting device. The relative position of the markings on the shaft wall with respect to the desired position of the guide rail depends on how the guide rail is aligned relative to the marking. For example, it is possible for a specific alignment device, in particular an alignment device according to the invention, to be used. The position of the markings is adapted to the type of alignment, the design of the shaft material and optionally the type of alignment device.

Instead of applying markings onto a shaft wall for aligning a guide rail, the mounting device can also apply markings onto a shaft wall for aligning a rail bracket lower part. The mounting device then carries out a corresponding method in which such markings are applied to a shaft wall of an elevator shaft.

The rail bracket lower part may be designed in particular as an omega bracket. The position of the rail bracket upper part of an omega bracket relative to the rail bracket lower parts can be changed only in a direction that is perpendicular to the shaft wall. As soon as the rail bracket lower parts are firmly secured to the shaft wall, only the position of the rail bracket upper part relative to the rail bracket lower parts can be changed perpendicularly to the shaft wall in order to orient the guide rail. The rail bracket lower parts must therefore be secured to the shaft wall such that the desired position of the guide rail held on the omega bracket can be adjusted only with the described change in position of the rail bracket upper part with respect to the rail bracket lower parts. The rail bracket lower parts and therefore the omega bracket therefore have to be secured to the shaft wall at a specific desired position, which is indicated by a marking applied to the shaft wall by the mounting device.

In this case, the mounting device can in particular be advantageously used if the mounting device drills holes into the shaft wall in an automated manner, introduces fastening elements, for example screws or tie bolts, and applies a corresponding marking to the shaft wall. At least part of the marking is applied in particular such that an edge of the rail bracket lower part has to be aligned along a marking. Securing and aligning the rail bracket lower part or the entire omega bracket on the marking applied by the mounting device is then carried out manually by an installer. The mounting device drills in particular two holes which are mutually spaced in the main extension direction of the elevator shaft and introduces fastening elements into said holes. These two holes and the fastening elements form two dots of said marking on the shaft wall. It is therefore sufficient for the mounting device to mark a further dot or line which is spaced from the above-mentioned holes transversely to the main extension direction of the elevator shaft. Rail bracket lower parts usually have slots for fastening elements which allow displacement of the rail bracket lower parts with respect to fastening elements transversely to the main extension direction of the elevator shaft. When tie bolts are used, the rail bracket lower part can be placed on the tie bolts and then moved transversely to the main extension direction of the elevator shaft until the marking on the shaft wall is reached and therefore until the desired position of the rail bracket lower part is reached. As soon as the desired position is reached, the rail bracket lower part is firmly secured to the shaft wall by means of nuts of the tie bolts. For this purpose, the nuts are screwed onto a thread that protrudes out of the borehole after insertion.

A method for mounting a rail bracket lower part, in particular an omega bracket, is therefore possible, in which method first some mounting steps are carried out by means of a mounting device, which has a carrier component, an installation component and a control apparatus for controlling the installation component. The carrier component is designed to be displaced relative to the elevator shaft and to be positioned at different heights within the elevator shaft. The installation component is held on the carrier component and is designed to carry out a mounting step as part of the installation process in an at least partially automated manner. The control apparatus determines, on the basis of an actual position of the mounting device and a desired position of the rail bracket lower part to be installed in the elevator shaft, a position of a marking on a shaft wall of the elevator shaft relative to the actual position of the mounting device. On the basis of said marking, the desired position of the rail bracket lower part can be determined in a following installation step. This marking is applied to the shaft wall by means of the installation component. The rail bracket lower part is then aligned relative to said marking and is secured to the shaft wall. In particular, these two final steps are performed manually by an installer.

Further advantages, features and details of the invention can be found in the following description of embodiments and with reference to the drawings, in which like or functionally like elements are provided with identical reference signs. The drawings are merely schematic and are not to scale.

DETAILED DESCRIPTION

Figure 1:
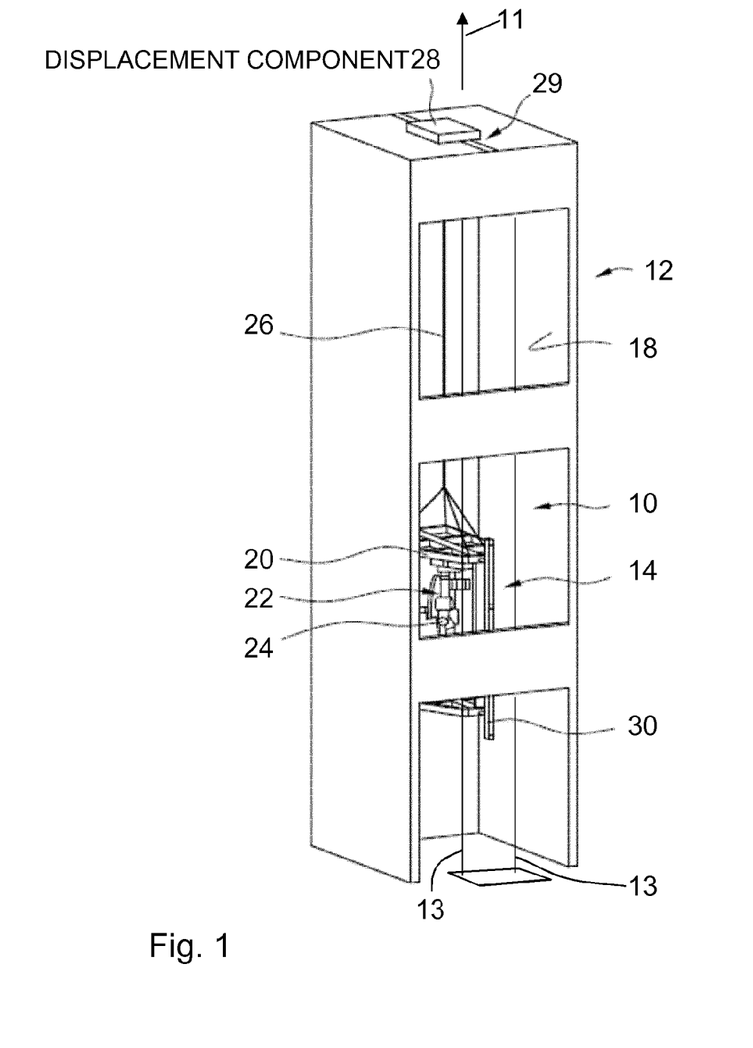
FIG. 1 is a perspective view of an elevator shaft of an elevator system with a mounting device accommodated therein.

FIG. 1 shows a mounting device 14 arranged in an elevator shaft 10 of an elevator system 12, by means of which holes can be drilled into a shaft wall 18, tie bolts can be introduced into the holes, and markings for later alignment of shaft material can be applied to the shaft walls 18. The elevator shaft 10 extends in a main extension direction 11, which is aligned vertically in FIG. 1. By means of the tie bolts (not shown), shaft material, for example in the form of rail bracket lower parts, can be secured to the shaft wall 18 in a later mounting step. This securing is in particular carried out manually by an installer.

The mounting device 14 has a carrier component 20 and a mechatronic installation component 22. The carrier component 20 is designed as a frame on which the mechatronic installation component 22 is mounted. Said frame has dimensions that permit the carrier component 20 to be vertically displaced within the elevator shaft 10, i.e. for example to move to different vertical positions on different stories within a building. In the example shown, the mechatronic installation component 22 is designed as an industrial robot 24 which is attached to the frame of the carrier component 20 so as to be suspended downwardly. In this case, one arm of the industrial robot 24 can be moved relative to the carrier component 20 and, for example, displaced towards the shaft wall 18 of the elevator shaft 10.

The carrier component 20 is connected, via a steel cable acting as a suspension means 26, to a displacement component 28 in the form of a motor-driven cable winch that is attached at the top of the elevator shaft 10 to a stopping point 29 on the ceiling of the elevator shaft 10. By means of the displacement component 28, the mounting device 14 can be moved within the elevator shaft 10 in the main extension direction 11 of the elevator shaft 10, i.e. vertically over the entire length of the elevator shaft 10.

The mounting device 14 further comprises a securing component 30, by means of which the carrier component 20 can be secured within the elevator shaft 10 in the lateral direction, i.e. in the horizontal direction.

Two reference elements 13 in the form of cords are tensioned in the elevator shaft 10 over the entire length thereof, which elements are oriented in the main extension direction 11. The reference elements 13 are attached in the elevator shaft 10 by an installer and provide the reference for aligning and mounting of guide rails of the elevator system 12. When mounted, the guide rails therefore need to extend in parallel with the reference elements 13 and at a specific spacing from the reference elements 13.

Figure 2:
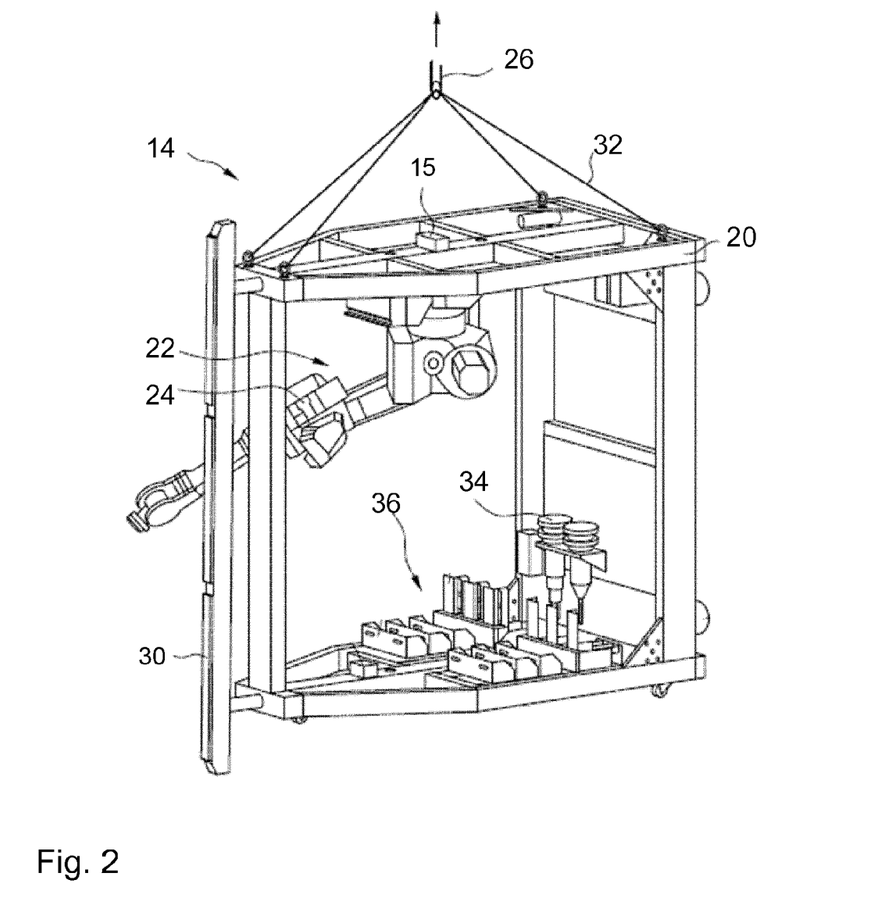
FIG. 2 is a perspective view of a mounting device.

FIG. 2 is an enlarged view of a mounting device 14.

The carrier component 20 is formed as a cage-like frame, in which a plurality of horizontally and vertically extending bars form a mechanically robust structure.

Retaining cables 32 are attached to the top of the cage-like carrier component 20, which cables can be connected to the suspension element 26.

In the embodiment shown, the mechatronic installation component 22 is formed using an industrial robot 24. In the example shown, the industrial robot 24 is equipped with a plurality of robotic arms that are pivotable about pivot axes. The industrial robot may, for example, have at least six degrees of freedom, i.e. a mounting tool 34 guided by the industrial robot 24 can be moved with six degrees of freedom, i.e., for example, with three degrees of rotational freedom and three degrees of translational freedom. The industrial robot can, for example, be designed as a vertical buckling arm robot, a horizontal buckling arm robot, a SCARA robot or a cartesian robot, or as a portal robot.

The industrial robot 24 and therefore the installation component 22 are controlled by a control apparatus 15 arranged on the carrier component 20.

The unsupported end of the robot can be coupled to different mounting tools 34, as a result of which the tools become part of the installation component 22. The mounting tools 34 can differ with regard to their design and their intended use. The mounting tools 34 can be held on the carrier component 20 in such a way that the unsupported end of the industrial robot 24 can be brought towards said tools or sensors and be coupled to one thereof. For this purpose, the industrial robot 24 can have, for example, a tool changing system which is designed such that it allows at least the handling of a plurality of mounting tools 34 of this kind.

One of the mounting tools 34 is designed as a sensor, for example as a laser scanner, by means of which the relative location of the carrier component 20 relative to the reference elements 13 can be defined by the control apparatus 15. This can be carried out, for example, using a method which is described in the international application from the applicant having the number WO 2017/167719 A1. The position of the carrier component 20, and therefore the actual position of the mounting device 14, in the elevator shaft 10 can be detected from the relative location of the carrier component 20 in relation to the reference elements 13. Based on the position of the carrier component 20, it can be determined at which points of the shaft wall 18 a shaft material is to be arranged. The desired position of the shaft material to be installed is therefore determined. Based on the requirement that the mounted guide rails must extend in parallel with the reference elements 13 and at a specific spacing thereto, a position of a marking on the shaft wall 18 can be determined which is used for aligning the guide rail. The alignment of the guide rail is explained in more detail in conjunction with FIG. 3 and FIG. 4. The position of the marking is determined relative to the actual position of the mounting device 14.

The position of the carrier component 20 in the elevator shaft 10 can be determined using a digital model of the elevator system 12. For this purpose, the elevator shaft 10 has to be measured by means of a laser scanner, for example.

One of the mounting tools 34 can be configured as a drilling tool similar to a drilling machine. By coupling the industrial robot 24 to a drilling tool of this kind, the installation component 22 can be configured in such a way that it allows for an at least partially automated controlled drilling of fastening holes in one of the shaft walls 18 of the elevator shaft 10. In this case, the drilling tool may be moved and handled by the industrial robot 24 in such a way that the drilling tool, using a drill, drills holes at a specified position in the shaft wall 18 of the elevator shaft 10, into which holes fastening elements in particular in the form of tie bolts are later inserted in order to secure rail bracket bases.

A further mounting tool 34 is configured as a driving tool in order to introduce, in an at least partially automated manner, tie bolts into previously drilled holes in the shaft wall 18 of the elevator shaft 10.

Securing the shaft material by means of the tie bolts in the shaft walls 18 is carried out manually by an installer in a later mounting step.

A further mounting tool 34 is designed as a marking tool, for example in the form of a pen or a stamp, in order to apply a marking (69 in FIG. 3) to a shaft wall 18. This marking is used for later manual alignment of shaft material in the form of rail bracket lower parts and/or guide rails by the desired position of the shaft material being determined on the basis of the marking.

A magazine component 36 may also be provided on the carrier component 20. The magazine component 36 can be used to store the tie bolts and provide them to the installation component 22.

In the example shown, the industrial robot 24 can, for example, automatically grasp a tie bolt from the magazine component 36 and, for example, drive it into previously a drilled hole in the shaft wall 18 using a mounting tool 34 designed as a screwdriver.

After the tie bolts have been driven into the holes in the shaft wall 18 of the elevator shaft 10, the mounting tool 34 designed as a marking tool can be reconfigured and a marking in the form of two dots or lines can be applied to a shaft wall 18.

As soon as markings are applied to the shaft walls 18, the reference elements 13 are no longer necessary for aligning the guide rails.

After all the holes in the elevator shaft have been drilled and provided with tie bolts and all the markings for aligning the shaft material have been applied to the shaft walls, the installation is performed manually by an installer.

The installer first mounts the rail bracket lower parts on the shaft wall by means of the tie bolts. In this case, he can first mount all the rail bracket lower parts in the elevator shaft, then mount the rail bracket upper parts above these lower parts, and orient and secure the guide rails on the shaft walls. It is also possible for the installer to carry this out in portions.

Figure 3:
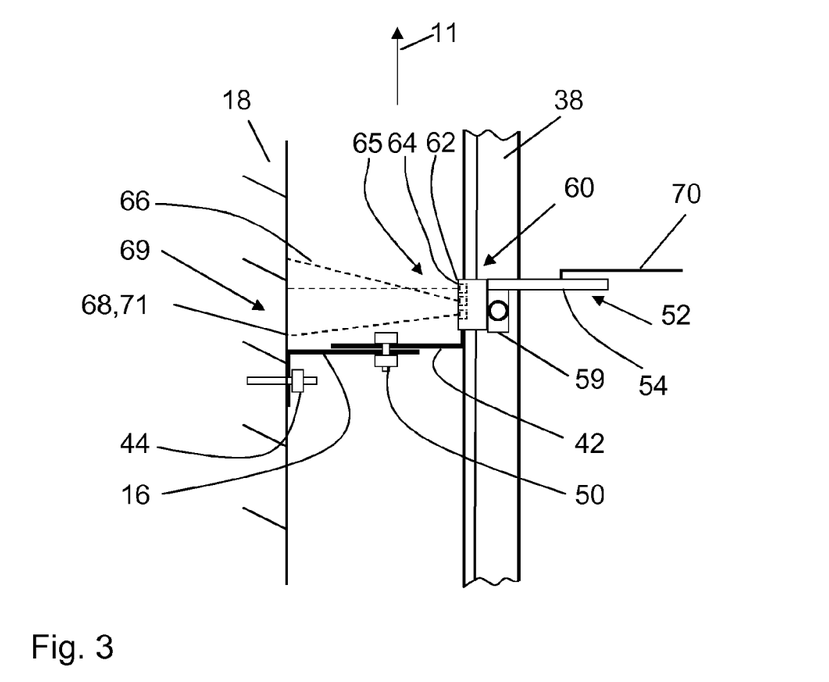
FIG. 3 is a side view of an alignment device according to the invention arranged on a guide rail.
Figure 4:
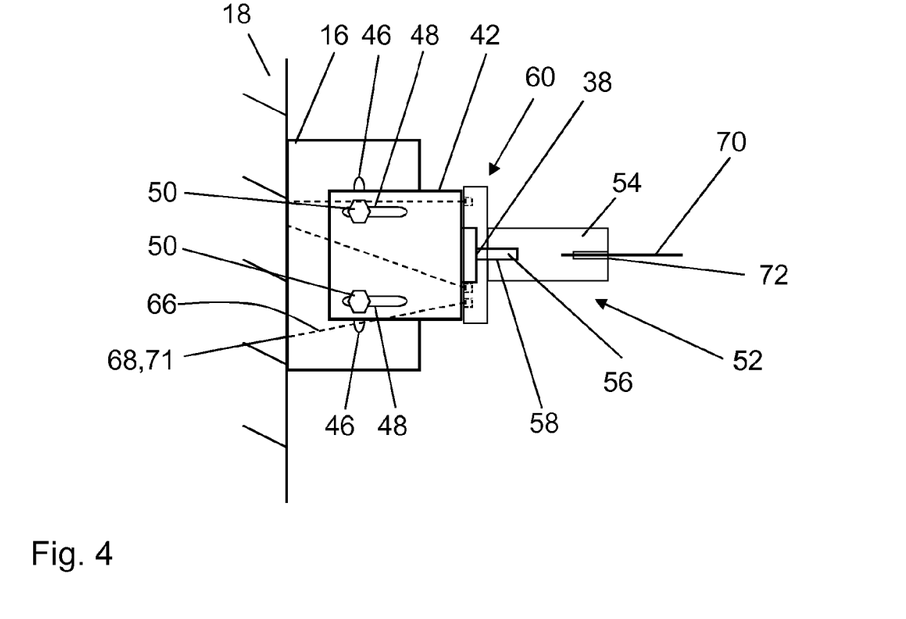
FIG. 4 is a view of the arrangement from FIG. 3 from above.

First, the procedure for mounting a guide rail by means of a "normal" rail bracket, which consists only of a single rail bracket lower part and a rail bracket upper part, is described in connection with FIG. 3 and FIG. 4.

First, a guide rail 38 is temporarily fastened to a shaft wall 18. For this purpose, a rail bracket lower part 16 is secured on the shaft wall 18 by means of two tie bolts 44. In addition, the guide rail 38 is fastened to a rail bracket upper part 42, which has a primarily L-shaped cross section, by means of rail clips (not shown). The longer part of the rail bracket upper part 42 rests on the rail bracket base 16, which also has a primarily L-shaped cross section. In order to be able to interconnect the two rail bracket parts 16, 42, the rail bracket base 16 has two slots 46 which extend in a line primarily in parallel with the shaft wall 18. The rail bracket upper part 42 also has two slots 48 which extend perpendicularly to the shaft wall 18 in parallel with one another. The slots 46 and 48 are arranged such that in each case a bolt-nut connection 50 can be guided through the slots 46, 48 and the two rail bracket parts 16, 42 can therefore be interconnected. By means of the total of four slots 46, 48, the relative location of the two rail bracket parts 16, 42 with respect to one another can be changed and therefore can be aligned with respect to the guide rail 38 rigidly connected to the rail bracket upper part 42. First, the bolt-nut connections 50 are tightened firmly only to the extent that although the two rail bracket parts 16, 42 are connected, said parts are still movable with respect to one another.

An alignment device 52 is used for aligning the guide rail 38. The alignment device 52 comprises an abutment part 54 which has a recess 56. The recess 56 has a complementary shape to a running surface 58 of the guide rail 38. The abutment part 54, as shown in FIG. 3 and FIG. 4, can therefore be placed on the guide rail 38 such that the running surface 58 of the guide rail 38 extends through the recess 56 and rests on the edge of the recess 56 with zero backlash. In this state, the abutment part 54, and therefore the alignment device 52, has a defined position relative to the guide rail 38. In order that this position can be maintained reliably, the alignment device 52 comprises a clamping device 59 (shown only schematically) by means of which the alignment device 52 can be firmly clamped to the guide rail 38.

A targeting device 60 is fastened to the abutment element 54, which targeting device has a primarily U-shaped cross section and receives the guide rail 38. Three lasers 64 are arranged on the side 62 oriented in the direction of the shaft wall 18, which lasers each emit a laser beam 66 (dashed lines) toward the shaft wall 18. The lasers 64 are oriented such that the laser beams 66 emerge from the targeting device 60 at different angles and project three dots 71 onto the shaft wall 18. The three lasers 64 therefore together form a laser means 65. Three dots 68 are arranged on the shaft wall 18 which together form a marking 69. The dots 68 were applied to the shaft wall 18 by means of a mounting device according to FIG. 1 and FIG. 2 in a previous mounting step and are positioned such that the guide rail 38 is correctly aligned when the laser beams 66 are oriented precisely with respect to the dots 68, i.e. the dots 71 projected onto the shaft wall 18 by the lasers 64 lie precisely on the dots 68 of the marking 69. In order to orient the guide rail 38, an installer must adjust the position of the rail bracket upper part 42, and therefore of the guide rail 38, in relation to the guide rail base 16 such that the laser beams 66 precisely strike the markings 68. If this is the case, the installer tightens the bolt-nut connections 50 so firmly that movement between the two rail bracket parts 16, 42 is no longer possible. The guide rail 38 is therefore firmly secured and aligned on the shaft wall 18.

Particularly precise alignment of guide rails is achieved when two opposing guide rails 38 are simultaneously aligned and secured to the relevant shaft wall 18 as described. The correct alignment can also be checked in this case.

The two alignment devices 52 are connected by a cord 70 for this purpose. When the two opposing guide rails 38 are correctly aligned, the cord must, in both checking devices 52, extend exactly over an elongate verification marking in the form of a groove 72. This is checked by the installer.

The installer also checks whether the two guide rails are at the correct spacing to one another using what is known as a track gauge (a rod having a defined length). This is the case if the track gauge fits horizontally exactly between the two opposing guide rails.

In the following, the procedure for mounting a rail bracket in the form of an omega bracket on a shaft wall is described in connection with FIG. 5 and FIG. 6.

Figure 5:
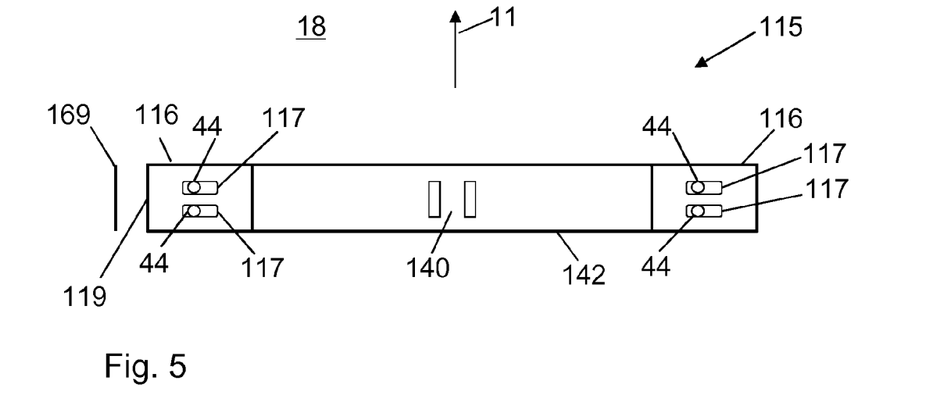
FIG. 5 is a plan view of a rail bracket in the form of an omega bracket on a shaft wall having a marking.
Figure 6:
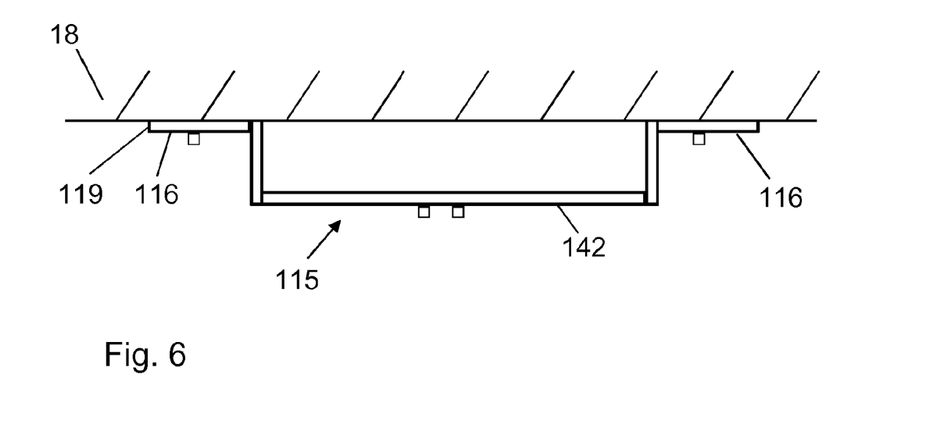
FIG. 6 is a view of the rail brackets from FIG. 5 from above.

An omega bracket 115 consists of two rail bracket lower parts 116 and a rail bracket upper part 142 arranged between the rail bracket lower parts 116, on which rail bracket upper part rail clips 140 are arranged for securing a guide rail (not shown in FIG. 5 and FIG. 6). The position of the rail bracket upper part 142 and of the two rail bracket lower parts 116 relative to one another is changed in a direction that is perpendicular to the shaft wall 18 and therefore a guide rail (not shown in FIG. 5 and FIG. 6) is aligned at least in part.

In order to be able to secure the omega bracket 115 to a shaft wall 18, for each rail bracket lower part 116 two holes which are arranged one above the other in the main extension direction 11 of the elevator shaft are drilled and tie bolts 44 are inserted by means of the mounting device 14. Since, as soon as the rail bracket lower parts 116 are firmly secured to the shaft wall 18, only the position of the rail bracket upper part 142 relative to the rail bracket lower parts 116 can be changed perpendicularly to the shaft wall 18 in order to orient the guide rail. The rail bracket lower parts 116 must be secured to the shaft wall 18 such that the desired position of the guide rail held on the omega bracket 115 can be adjusted only with the described change in position. The rail bracket lower parts 116 and therefore the omega bracket 115 therefore have to be secured to the shaft wall 18 at a specific desired position. This desired position is marked by the mounting device 14 with a marking in the form of a line 169. In order to be able to bring the omega bracket 115 into its desired position, the rail bracket lower parts 116 each have two slots 117 which are arranged one above the other in the main extension direction 11 of the elevator shaft and extend in the horizontal direction.

In order to secure the omega bracket 115 to the shaft wall 18, the installer arranges the omega bracket 115 on the shaft wall 18 such that four tie bolts 44 project through four corresponding slots 117 of the rail bracket lower parts 116. He then screws the nuts onto the thread of the tie bolts 44 and tightens them gently. He therefore provisionally secures the omega bracket 115 on the shaft wall 18. He then moves the omega bracket 115 along the shaft wall 18 until an edge 119 of the rail bracket lower part 116 on the left in FIG. 5 and FIG. 6 is aligned with the line 169 and therefore the omega bracket 115 has reached its desired position. Finally, the installer tightens the nuts of the tie bolts 44 and thereby firmly secures the omega bracket 115 to the shaft wall 18. The omega bracket 115 is therefore arranged on the shaft wall 18 such that the desired position of the guide rail held thereby can be adjusted only by changing the position of the rail bracket upper part 142 with respect to the guide rail bracket lower parts 116 in the perpendicular direction with respect to the shaft wall 18. For the final alignment of the guide rail, an alignment device according to FIG. 3 and FIG. 4 can also be used.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An alignment device for alignment of a guide rail in an elevator shaft of an elevator system relative to a shaft wall of the elevator shaft, the alignment device comprising:
   an abutment part having a recess with a complementary shape to a running surface of the guide rail; and
   a targeting device fastened to the alignment device and having a laser means that projects at least three mutually spaced projected dots onto the shaft wall when the alignment device is positioned in the elevator shaft, wherein a marking on the shaft wall includes at least three mutually spaced marking dots, and when the guide rail is positioned in the recess and the abutment part is brought into a defined position relative to the marking on the shaft wall, the at least three projected dots lie on the at least three marking dots and the guide rail is aligned with the shaft wall.

2. The alignment device according to claim 1 wherein the laser means has three lasers for projecting the at least three projected dots.

3. The alignment device according to claim 1 including an elongate verification marking formed on the abutment part for checking a correct course of a cord fastened to the alignment device.

4. A method for mounting a guide rail in an elevator shaft of an elevator system using a mounting device including a carrier component, an installation component, and a control apparatus for controlling the installation component, wherein the carrier component is adapted to be displaced relative to the elevator shaft and positioned at different heights within the elevator shaft, and wherein the installation component is held on the carrier component and is adapted to carry out mounting steps in an at least a partially automated manner as part of a guide rail installation process, the method comprising the following steps:
   the control apparatus determining, based on an actual position of the mounting device in the elevator shaft and a desired position of a guide rail to be installed in the elevator shaft, a marking position for a marking on a shaft wall of the elevator shaft relative to the actual position of the mounting device;
   applying the marking to the shaft wall at the marking position by the installation component;
   aligning the guide rail relative to the marking; and
   securing the guide rail on the shaft wall.

5. The method according to claim 4 including arranging an alignment device on the guide rail to orient the guide rail relative to marking; projecting three dots onto the shaft wall by a laser means of a targeting device; and moving the alignment device to bring the three dots into alignment with the marking on the shaft wall.

6. The method according to claim 5 wherein the marking on the shaft wall includes at least three mutually spaced dots.

7. The method according to claim 4 wherein the actual position of the mounting device and the desired position of the guide rail are determined based on at least one reference element arranged in the elevator shaft.

8. The method according to claim 7 wherein the at least one reference element extends in a main extension direction of the elevator shaft.

9. The method according to claim 4 including aligning two of the guide rail in opposition in the elevator shaft simultaneously using an associated different one of the marking for each of the guide rails.

10. The method according to claim 9 including aligning the two opposing guide rails each with a separate alignment device arranged on the guide rail to orient the guide rail relative to the associated marking, the two alignment devices being connected by a cord, and checking a correct course of the cord relative to the alignment devices.

11. The method according to claim 9 including checking a spacing between the two opposing guide rails.

* * * * *